United States Patent
Furukawa et al.

(10) Patent No.: US 8,112,533 B2
(45) Date of Patent: Feb. 7, 2012

(54) DATA TRANSMISSION DEVICE

(75) Inventors: Akihiro Furukawa, Nagoya (JP); Takanobu Suzuki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 95 days.

(21) Appl. No.: 12/389,797

(22) Filed: Feb. 20, 2009

(65) Prior Publication Data

US 2009/0216888 A1    Aug. 27, 2009

(30) Foreign Application Priority Data

Feb. 21, 2008    (JP) ................ 2008-039506

(51) Int. Cl.
G06F 15/16    (2006.01)
G06F 15/173    (2006.01)
(52) U.S. Cl. ......... 709/228; 709/217; 709/223; 709/224
(58) Field of Classification Search .......... 709/228, 709/217, 223, 224
See application file for complete search history.

(56) References Cited

U.S. PATENT DOCUMENTS

| | | | | |
|---|---|---|---|---|
| 5,996,029 | A * | 11/1999 | Sugiyama et al. | 710/15 |
| 7,486,673 | B2 * | 2/2009 | Harijono et al. | 370/389 |
| 2003/0069921 | A1 * | 4/2003 | Lamming et al. | 709/203 |
| 2003/0208607 | A1 * | 11/2003 | Yamazaki | 709/229 |
| 2004/0153468 | A1 * | 8/2004 | Paila et al. | 707/101 |
| 2005/0030579 | A1 * | 2/2005 | Tohyama | 358/1.15 |
| 2006/0039037 | A1 | 2/2006 | Shibata | |
| 2006/0132616 | A1 * | 6/2006 | Tanaka et al. | 348/211.3 |
| 2006/0159110 | A1 * | 7/2006 | Choi et al. | 370/401 |
| 2007/0047457 | A1 * | 3/2007 | Harijono et al. | 370/250 |
| 2007/0064124 | A1 * | 3/2007 | Kirani et al. | 348/234 |
| 2007/0208774 | A1 * | 9/2007 | Paila et al. | 707/103 R |
| 2008/0155621 | A1 * | 6/2008 | Jang et al. | 725/105 |
| 2008/0209010 | A1 * | 8/2008 | Zitnick, III et al. | 709/219 |
| 2008/0281699 | A1 * | 11/2008 | Whitehead | 705/14 |
| 2009/0180484 | A1 * | 7/2009 | Igarashi | 370/401 |
| 2009/0292824 | A1 * | 11/2009 | Marashi et al. | 709/247 |
| 2010/0115155 | A1 * | 5/2010 | Otsuka et al. | 710/39 |

FOREIGN PATENT DOCUMENTS

JP    H08-305643 A    11/1996
JP    2006-060499 A    3/2006

* cited by examiner

*Primary Examiner* — Karen Tang
(74) *Attorney, Agent, or Firm* — Baker Botts L.L.P.

(57) ABSTRACT

A data transmission device to transmit a data file to an external device is provided. The data transmission device includes a data file storing unit to store a data file to be transmitted, a communication session establishing unit, which is capable of establishing a plurality of communication sessions between the data transmission device and the external device, a data transmitting unit to transmit data included in the data file and divided in portions concurrently through the plurality of communication sessions to the external device.

13 Claims, 8 Drawing Sheets

TRANSMISSION MANAGEMENT DATA STORAGE AREA 28

| | 100 |
|---|---|
| IP ADDRESS | 192.168.0.5 |
| CONNECTION ID | XXXXXXX |
| DATA TRANSMISSION STARTING POINT | 0 |
| TOTAL NUMBER OF BYTES | 15000 |
| NUMBER OF TRANSMITTED BYTES | 1000 |

- 102 IP ADDRESS
- 104 CONNECTION ID
- 106 DATA TRANSMISSION STARTING POINT
- 108 TOTAL NUMBER OF BYTES
- 110 NUMBER OF TRANSMITTED BYTES

FIG. 4

DATA TRANSMISSION DEVICE

CROSS REFERENCE TO RELATED APPLICATION

This application claims priority from Japanese Patent Application No. 2008-039506, filed on Feb. 21, 2008, the entire subject matter of which is incorporated herein by reference.

BACKGROUND

1. Technical Field

Aspects of the present invention relate to a data transmission device, which is capable of transmitting data to an external device.

2. Related Art

Devices capable of transmitting data to external devices through a network have been used. For example, Japanese Patent Provisional Publication No. 2006-60499 discloses a scanner device capable of transmitting data, which is generated based on a scanned image, to another device in a network. As a consequence of development of data transmission devices, techniques to enable fast data transmission have been appreciated.

SUMMARY

A data file including data created by the data transmission device such as the scanner device, representing the images formed on an original document, may be in a large volume, specifically when the original document is in a large volume, and transmission of such data may require longer runtime when the data file is transmitted from the data transmission device to an external device serially through a single communication session. Although a data transmission device, which is capable of establishing a plurality of communication sessions with an external device concurrently, has been known, such a data transmission device transmits a plurality of data files through the plurality of communication sessions, but does not transmit a single data file through the plurality of communication sessions to reduce transmission runtime.

In view of the above drawbacks, the present invention is advantageous in that a data transmission device, which is capable of transmitting a data file to an external device in a shorter runtime, is provided.

According to an aspect of the invention, a data transmission device to transmit a data file to an external device is provided. The data transmission device includes a data file storing unit to store a data file to be transmitted, a communication session establishing unit, which is capable of establishing a plurality of communication sessions between the data transmission device and the external device, a data transmitting unit to transmit data included in the data file and divided in portions concurrently through the plurality of communication sessions to the external device.

According to another aspect of the invention, a computer usable medium including computer readable instructions to control a computer to transmit a data file to an external device is provided. The computer is controlled to execute steps of storing a data file to be transmitted, establishing a plurality of communication sessions between the data transmission device and the external device, and transmitting data included in the data file and divided in portions concurrently through the plurality of communication sessions to the external device.

According to still another aspect of the invention, a method to control a computer to transmit a data file to an external device is provided. The method includes storing a data file to be transmitted, establishing a first communication session to transmit the data file between the computer and the external device, examining as to whether a second communication session is available between the computer and the external device while the data file is being transmitted, dividing remaining data in the data file, which has not yet been transmitted in the first communication session, into pieces so that each data piece is transmitted through the first and the second communication sessions respectively between the computer and the external device when it is determined that the second communication session is available, and transmitting each data piece to the external device through the first and the second communication sessions respectively.

According to the above configurations, a single data files can be transmitted to the external device through the plurality of communication sessions concurrently; therefore, transmission of a data file can be completed within a shorter runtime than data transmission through a single communication session.

BRIEF DESCRIPTION OF THE ACCOMPANYING DRAWINGS

FIG. 4 illustrates a data structure in a transmission management data storage area in the scanner device according to the embodiment of the present invention.

DETAILED DESCRIPTION

Hereinafter, an embodiment according to an aspect of the present invention will be described with reference to the accompanying drawings.

Figure 1:
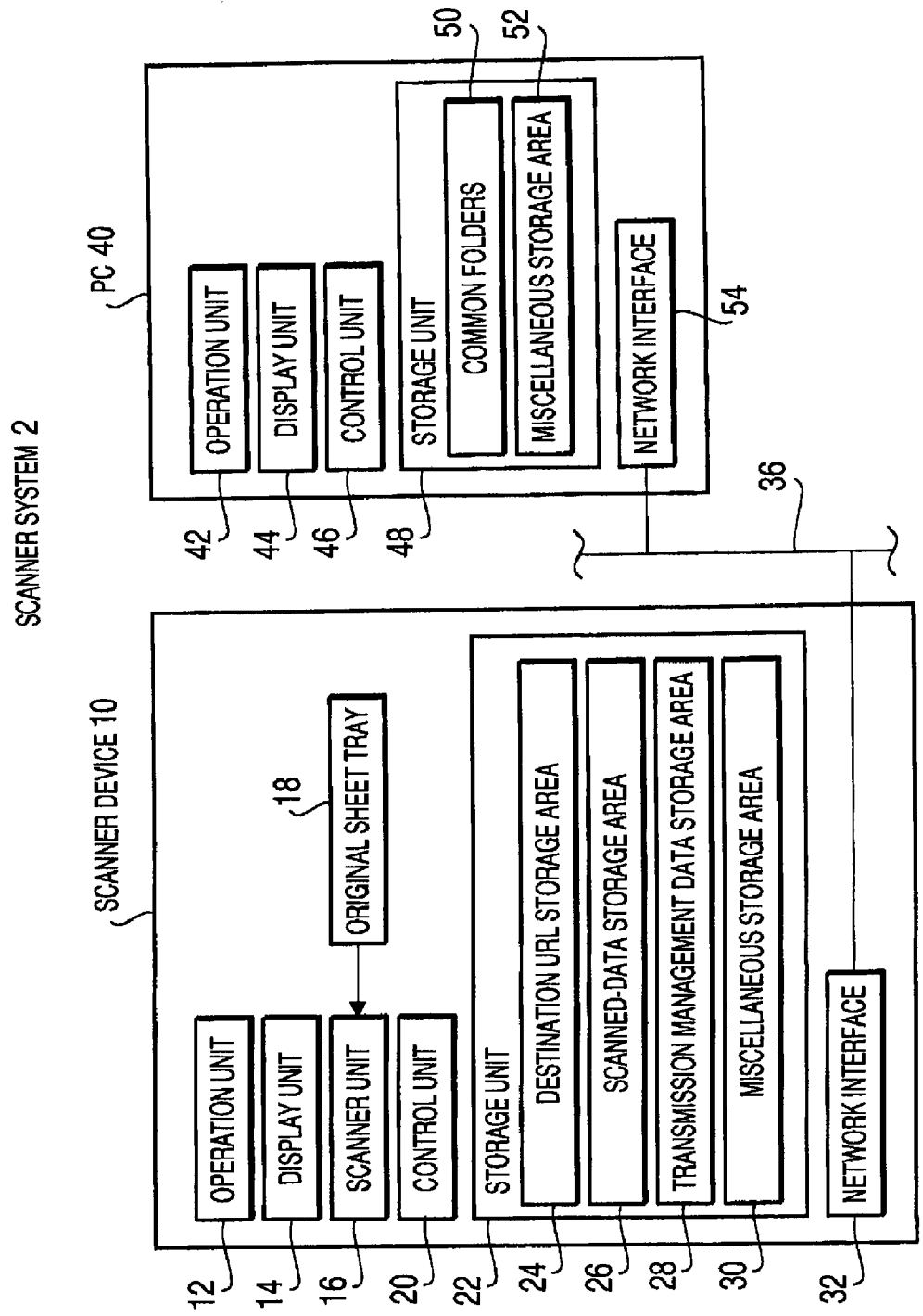
FIG. 1 is a block diagram to illustrate a scanner system according to an embodiment of the present invention.
Figures 2, 3:
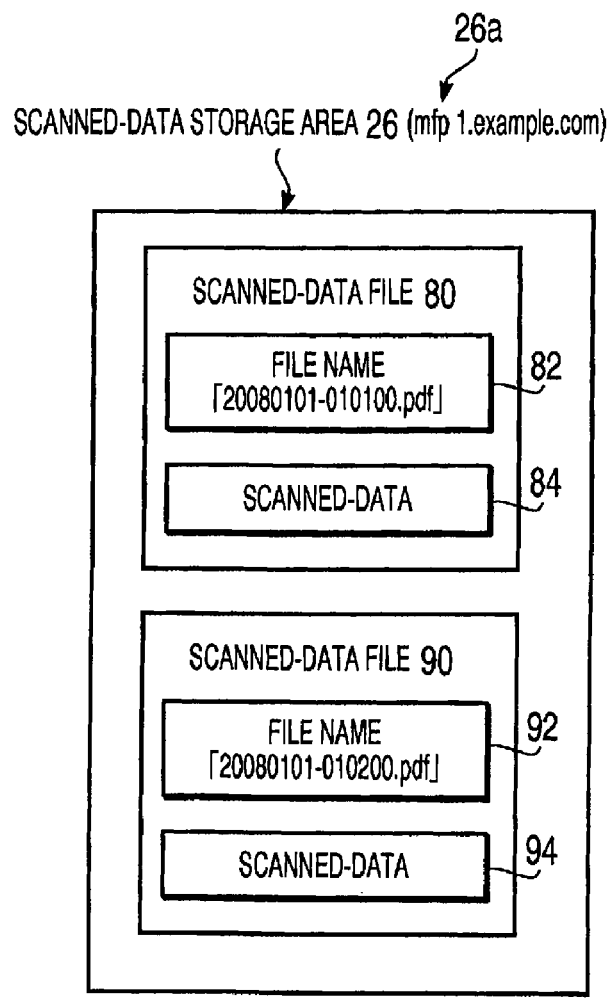
FIG. 2 illustrates a data structure in a destination URL storage area in a scanner device according to the embodiment of the present invention.
FIG. 3 illustrates a data structure in a scanned-data storage area in the scanner device according to the embodiment of the present invention.

FIG. 1 is a block diagram to illustrate a scanner system 2 according to the embodiment of the present invention. The scanner system 2 includes a scanner device 10 and a PC (personal computer) 40. Although solely one PC 40 is shown in FIG. 2 for simplicity in explanation, the scanner system 2 may include more than one PCs 40. The scanner device 10 and the PC 40 are connected with each other through a communication line 36, which is for example a LAN and the Internet.

The scanner device 10 is equipped with an operation unit 12, a display unit 14, a scanner unit 16, an original sheet tray 18, a control unit 20, a storage unit 22, and a network interface 32. The operation unit 12 includes a plurality of operation keys (not shown), which are operated by a user to enter various information and instructions to manipulate the scanner device 10. The scanner unit 16 scans an original sheet (not shown) placed on the original sheet tray 18 to read and generates scanned data representing the scanned image. The control unit 20 controls various operations of the scanner device 10 according to programs (not shown) stored in the storage unit 22 and instructions entered by the user. The control unit 20 includes a CPU (not shown) being a processor of various information. The operations to be controlled by the control unit 20 will be described later in detail.

The storage unit 22 includes a ROM, an EEPROM, and ROM (not shown). The storage unit 22 is provided with a destination URL storage area 24, a scanned-data storage area 26, a transmission management data storage area 28, and a miscellaneous storage area 30.

The destination URL storage area 24 is a storage area to store information to identify destination devices to which the scanned data is transmitted. FIG. 2 illustrates a data structure in the destination URL storage area 24 in the scanner device 10 according to the embodiment of the present invention. In the destination URL storage area 24, a plurality of data sets 70, 72 can be stored. Each of the data sets includes a name 60 of the data and a URL 62 of common folder. The name 60 identifies a destination device. The name 60 may represent, for example, a name of the user of the destination device. The URL 62 of common folder identifies a URL (uniform resource locator) of a shared folder in the destination device and can be accessed by external devices such as the scanner device 10. When the destination device is provided with a common folder, data stored in the common folder can be accessed by the external devices, and new data in the external devices can be stored in the common folder. The URL 62 of the common folder in the present embodiment includes an IP address of the destination device (i.e., the PC 40) in which the common folder is provided. More specifically, it is to be noted that the URL 62 of the common folder in the data set 70 (i.e., 192.168.0.2/common) includes an IP address "192.168.0.2" of the destination device. In the present embodiment, a character string such as "file://" which is generally to be included in a URL is omitted in the URL 62 of the common folder.

The data sets 70, 72 to identify the destination devices can be entered by the user through the operation unit 12 and stored in the destination URL storage area 24. The user may further enter the data sets 70, 72 in an external device, which is a device other than the scanner device 10, so that the external device can pass the data sets 70, 72 to the scanner device 10. The scanner device 10 stores the received the data sets 70, 72 in the destination URL storage area 24.

The scanned-data storage area 26 is a storage area to store the scanned data created in the scanner unit 16. FIG. 3 illustrates a data structure in the scanned-data storage area 26 in the scanner device 10 according to the embodiment of the present invention. In the present embodiment, the scanner device 10 has a hostname 26a (mfp1.example.com). The scanned-data storage area 26 can store a plurality of scanned-data files 80, 90. The scanned-data file 80 includes a piece of scanned data 84, and a file name 82 (i.e., 20080101-010100), which represents a date of creation of the scanned-data file 80. In the present embodiment, the file name 82 (20080101-010100) indicates that the scanned-data file 80 was created on 1:01:00 (1 minute and 0 second past 1 o'clock), Jan. 1, 2008. The file name 82 further includes a character string (.pdf), which indicates an extension of the scanned-data file 84. The extension indicates that the scanned data 84 is in PDF format. The scanned-data file 90 similarly includes a file name 92 and a piece of scanned data 94.

FIG. 4 illustrates a data structure in the transmission management data storage area 28 in the scanner device 10 according to the embodiment of the present invention. The transmission management data storage area 28 is a storage area to store a plurality of sets of transmission management data 100, although a single set of transmission management data 100 is illustrated in FIG. 4. A set of transmission management data 100 includes items which are an IP address 102 (i.e., 192.168.0.5) provided to the scanner device 10, a connection ID 104 (indicated by "xxxxxxx" in FIG. 4), a data transmission starting point 106 (i.e., 0), which indicates an initial byte of data transmission in the data transmission task, a total number of bytes 108 to be transmitted (i.e., 15000), and a number of transmitted bytes 110 (i.e., 1000). Functionalities and methods to set these items will be described later in detail.

The storage area 30 stores information which is other than the information to be stored in the destination URL storage area 24, the scanned-data storage area 26, and the transmission management data storage area 28.

The network interface 32 is connected to the communication line 36 so that the scanner device 10 can communicate with the PC 40 through the communication line 36.

Next, a configuration of the PC 40 will be described. The PC 40 is equipped with an operation unit 42, a display unit 44, a control unit 46, a storage unit 48, and a network interface 54. The operation unit 42 includes a keyboard and a mouse, through which various information and instructions are entered by a user. The display unit 44 displays various information to be processed in the PC 40 on a screen of a monitor (not shown). The control unit 46 controls various operations of the PC 40 according to programs (not shown) stored in the storage unit 48 and instructions entered by the user.

The storage unit 48 includes a ROM, an EEPROM, a RAM, and an HDD. The storage unit 48 is provided with a common folder 50 and a miscellaneous storage area 52. The common folder 50 can be created by the user who manipulates the operation unit 42. The common folder 50 is a shared folder which is provided in the PC 40 and can be accessed by the other external devices. A folder which is not set to be common is not accessible to the other external devices. In the present embodiment, the URL 62 of the common folder (i.e., 192.168.0.2/common) in the data set 70 of the destination device URL storage area 24 indicates a URL of the common folder 50 in the PC 40. The miscellaneous storage area 52 is a storage area for miscellaneous information.

The network interface 54 is connected to the communication line 36 so that the PC 40 can communicate with the scanner device 10 through the communication line 36.

Figure 5:
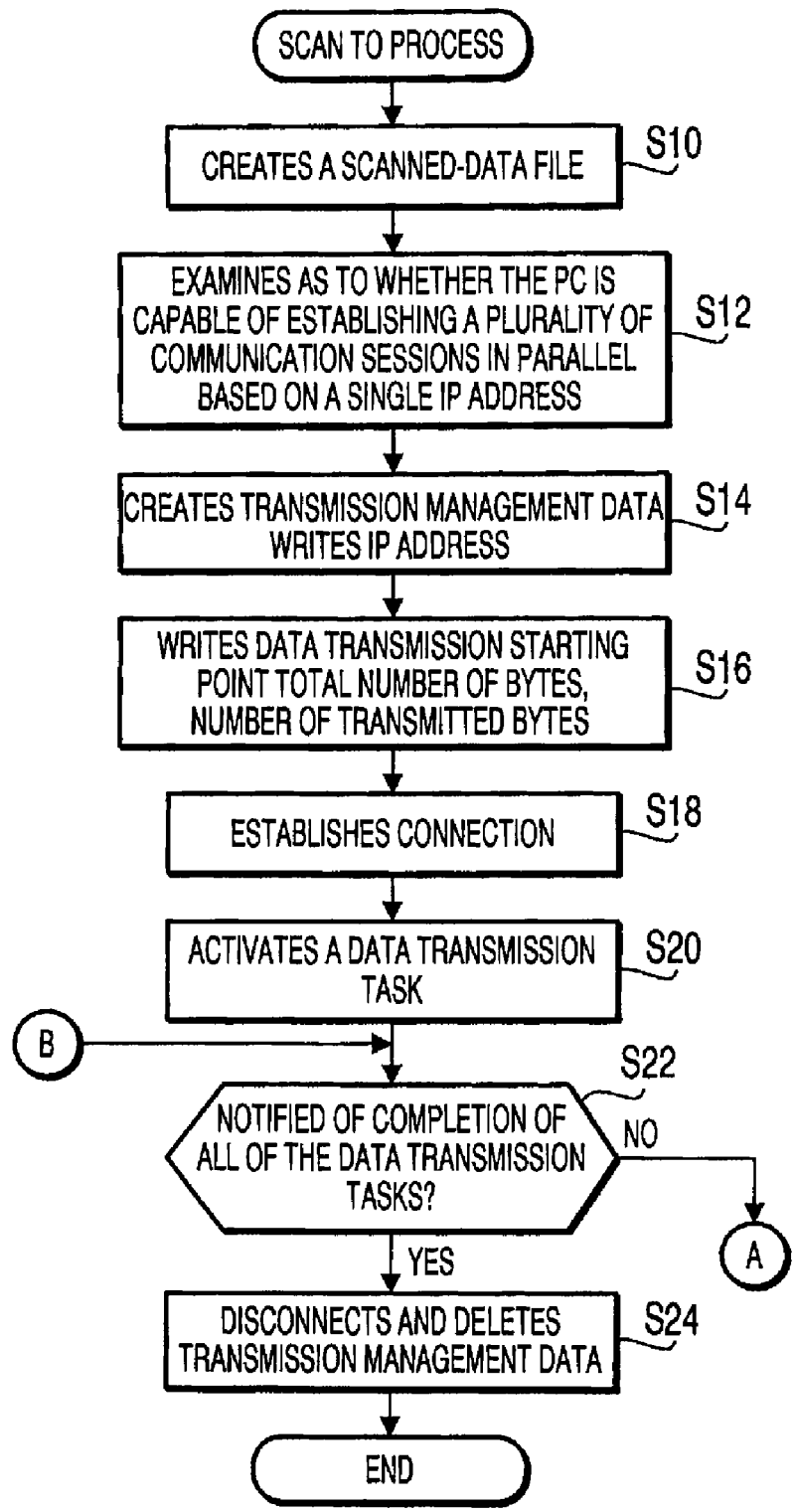
FIG. 5 is a flowchart to illustrate a part of a scanning process to be executed in the scanner device according to the embodiment of the present invention.
Figure 6:
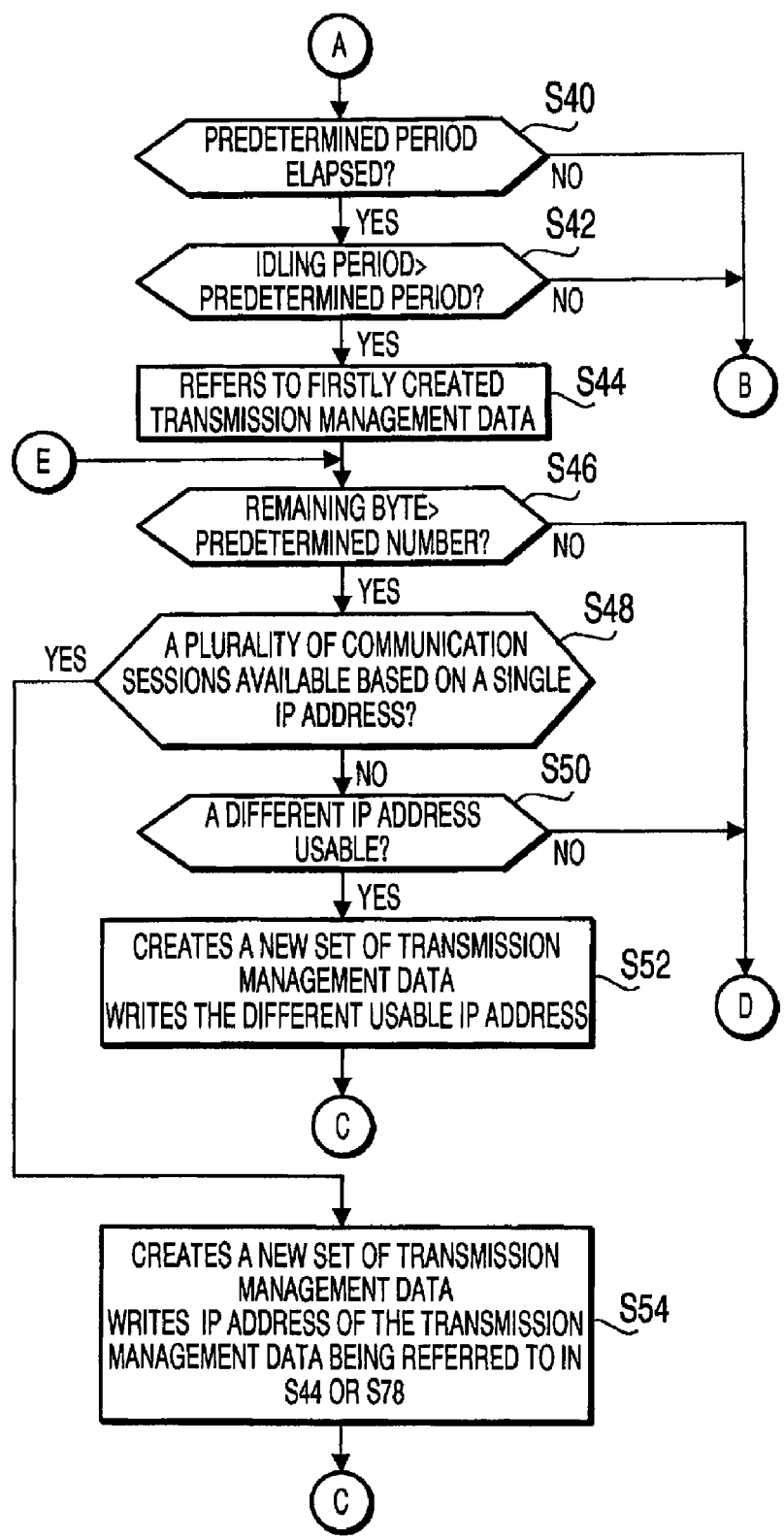
FIG. 6 is a flowchart to illustrate a part of the scanning process to be executed in the scanner device according to the embodiment of the present invention.
Figure 7:
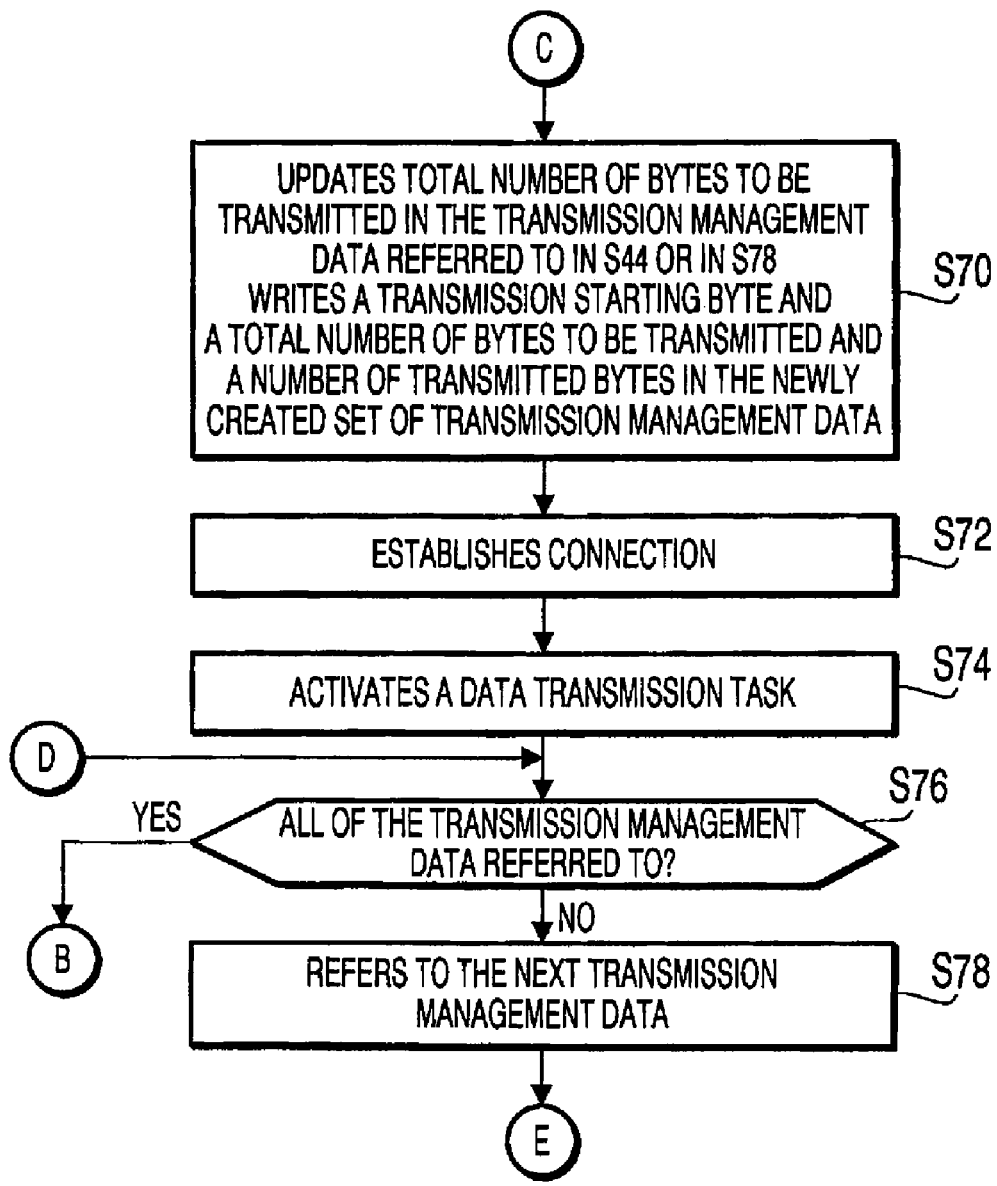
FIG. 7 is a flowchart to illustrate a part of the scanning process to be executed in the scanner device according to the embodiment of the present invention.

Next, a process to be executed by the control unit 20 in the scanner device 10 will be described. FIGS. 5-7 are flowcharts to illustrate a scanning process to be executed in the scanner device 10 according to the embodiment of the present invention. In the scanning process, the scanned data representing the image formed on an original sheet is transmitted to the destination device. The scanning process starts when the user designates at least one destination of the scanned data among a plurality of destinations registered in the scanner device 10. More specifically, the user manipulates the operation unit 12 to select at least one data set representing a destination device among the data sets 70, 72 which are stored in the destination URL storage area 24. When at least one data set is selected and the user manipulates the operation unit 12 to start the scanning process, the control unit 20 starts the scanning process starts.

When the scanning process starts, in S10, a file name for the scanned data is created prior to creating the scanned data. The file name includes a character string indicating a current date and an extension (see the file names 82, 92 in FIG. 2). When the file name is created, the scanner unit 16 is driven to scan the original sheet which is placed on the original sheet tray 18. Thus, when scanning is completed, the scanned data representing the scanned image is created. The scanned data and the file name are associated with each other and stored in the scanned-data storage area 26.

In S12, the control unit 20 examines as to whether a plurality of communication sessions can be established in parallel paths between an IP address provided to the scanner device 10 and the destination device (i.e., the PC 40) designated by the user. The scanner device 10 according to the present embodiment is capable of establishing a plurality of communication sessions in parallel paths based on a single IP address. In S12, it is examined as to whether the PC 40 is provided with the similar capability (i.e., as to whether capable of establishing a plurality of communication sessions in parallel paths). A method to establish a communication session between the scanner device 10 and the PC 10 includes the following steps:
1. The control unit 20 transmits a SYN (synchronization) packet to the PC 40.
2. A SYN/ACK (acknowledgement) packet is returned to the controller 20 by the PC 40.
3. The control unit 20 transmits an ACK packet to the PC 40, whereby connection based on TCP/IP is established.
4. The control unit 20 uses CIFS (Common Internet File System) to establish the communication session. Specifically, the control unit 20 transmits a negotiate REQ (request) of the CIFS to the PC 40.
5. A negotiate RESP (response) is returned to the control unit 20 by the PC 40.
6. The control unit 20 transmits a session REQ to the PC 40.
7. A session RESP is returned to the control unit 20 by the PC 40, whereby the communication session between one IP address of the scanner device 10 and the PC 40 is established.

It is to be noted that CIFS supports a plurality of certifying methods to establish a communication session. Therefore, the communication session may be established in a different certifying method than the method described above.

When the communication session as above (hereinafter, a first communication session) is established, the control unit 20 repeats the above steps 1-7 based on the same IP address of the scanner device 10. Thus, a second communication session is established. When the second communication session is established while the first communication is maintained, an examination result "YES" is stored in the storage area 30. When the first communication session is disconnected upon establishment of the second communication session, an examination result "NO" is stored in the storage area 30. Thereafter, the controller 20 disconnects the first and the second communication sessions.

In S14, the transmission management data 100 is created. More specifically, the control unit 20 reserves a predetermined-sized storage area in the transmission management data storage area 28 to store the transmission management data 100 to be created. Further, an IP address provided to the scanner device 10 and available for data transmission is written to be the IP address 102 in the transmission management data 100. In S14, no other information for the remaining items 104-110 in the transmission management data 100 is written.

In S16, information corresponding to the items 106-110 is provided to fill the transmission management data 100. Specifically, "0" is written to be the starting point 106 of data transmission, and a total number of bytes of the scanned data created in S10 is written to be the total number of bytes to be transmitted. Further, "0" is written to be the number of transmitted bytes 110. In S16, information for the connection ID 104 is not provided.

In S18, connection with the PC 40 is established based on the IP address 102 written in the transmission management data 100 in S14. The control unit 20 obtains a connection ID included in the session RESP which was returned by the PC 40 in the above step 7 and writes in the transmission management data 100 to be the connection ID 104. The obtained connection ID 104 is appended to data to be transmitted upon transmission and to a response packet which is returned in response to the transmission. Thus, based on the connection ID 104, the control unit 20 can recognize to which transmission the response packet is provided. Writing the connection ID 104 in the transmission management data 100 in S18 completes the transmission management data 100. Upon completion of S18, the control unit 20 activates an elapse time counter and an idle time counter. Values counted in the counters are used in S40 and S42 in FIG. 6, which will be described later in detail.

Figure 8:
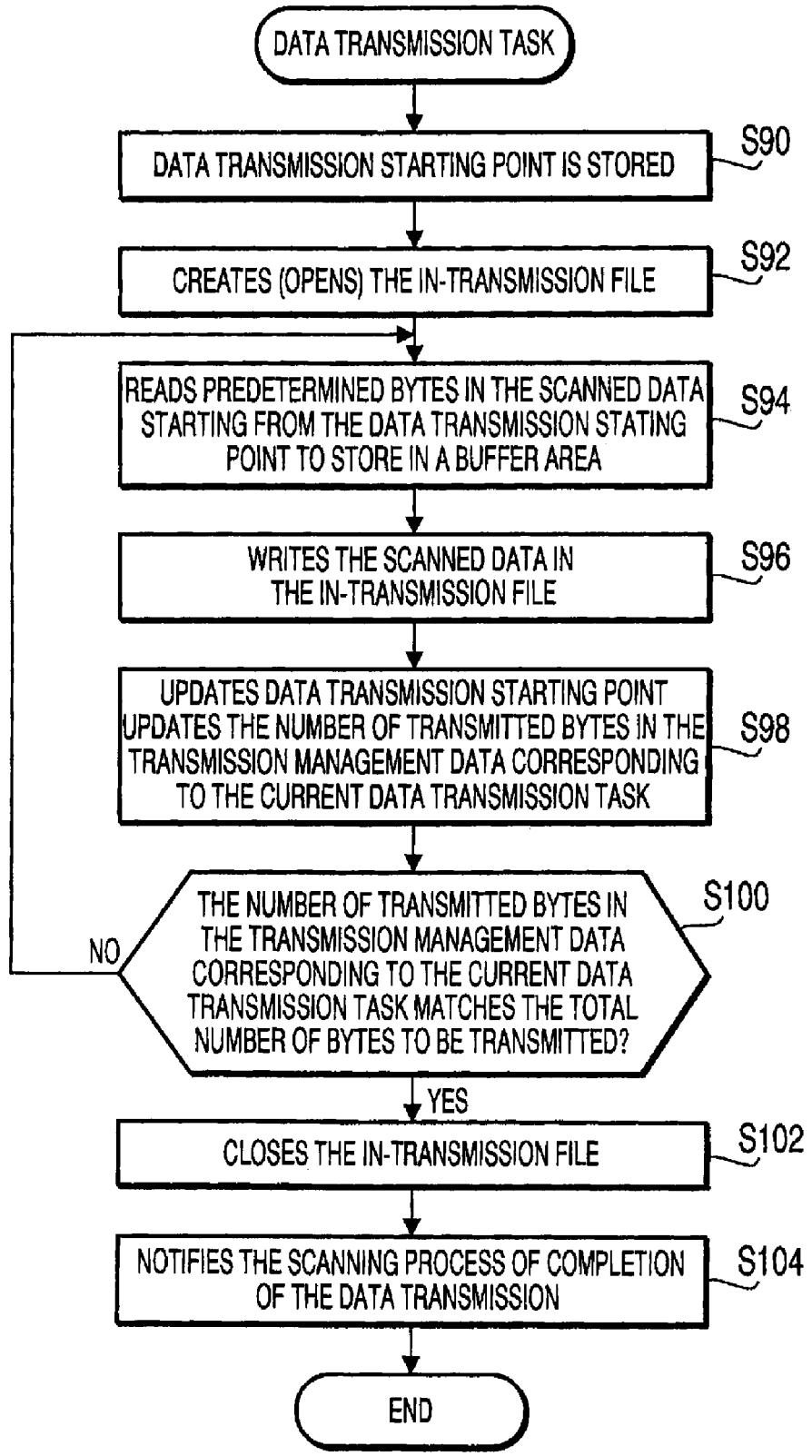
FIG. 8 is a flowchart to illustrate a data transmission task to be performed in the scanner device according to the embodiment of the present invention.

In S20, the control unit activates a data transmission task. FIG. 8 is a flowchart to illustrate a data transmission task to be performed in the scanner device 10 according to the embodiment of the present invention. When the data transmission task is activated in S20 in FIG. 5, a flow of steps illustrated in FIG. 8 is started. Further, the control unit 20 continues to execute steps following S22 in S5 concurrently with the data transmission task shown in FIG. 8. Accordingly, a plurality of data transmission tasks may run concurrently. In such a case, the transmission management data 100 is created for each data transmission task, and each of the data transmission tasks is provided with a corresponding set of transmission management data 100.

When a data transmission task is activated, in S90, a data transmission originated point of the scanned data is stored in the storage area 30 in the storage unit 22. The data transmission originated point defines a transmitted data portion and a remaining data portion in the scanned data in the data transmission task. Thus, when a plurality of data transmission tasks run concurrently, the data transmission originated points are set on the data transmission task basis. It is to be noted that the data transmission originated point may be stored in the transmission management data 100 to be one of the items to configure the transmission management data 100. In S90, the data transmission starting point 106 in the transmission management data 100 corresponding to the data transmission task is stored in the storage area 30 to be the data transmission originated point. For example, when a data transmission task corresponding to the transmission management data 100 created in S14-S18 in FIG. 5 is run, a data transmission originated point "0" is stored in the storage area 30 to be the data transmission originated point.

In S92, the control unit 20 examines as to whether the common folder 50 in the destination device (i.e., the PC 40), which was designated by the user prior to activation of the scanning process in FIG. 5, includes a file having a file name identical to the file name of the scanned data file created in S10 in FIG. 5. The data file stored in the common folder 50 having the file name identical to the file name of the scanned data file created in S10 in FIG. 5 will be hereinafter referred to as an in-transmission file. When no in-transmission file is stored in the common folder 50, the control unit 20 transmits a CREATE command, which instructs the PC 40 to create a data file having a file name identical to the file name of the scanned data file created in S10 in FIG. 5, to the PC 40. According to the CREATE command, the PC 40 creates an in-transmission file and stores in the common folder 50. It is to be noted that at this point the in-transmission file does not yet include contents of the scanned data. When an in-transmission file is stored in the common folder 50, the control unit 20 transmits an OPEN command, which instructs the PC 40 to open the in-transmission file, to the PC 40. In S92, the control unit 20 sets the in-transmission file to be shared to be writable by a plurality of data transmission tasks running concurrently.

In S94, the control unit 20 reads a predetermined number of bytes of the scanned data starting from the data transmission originated point, which is set in S90. For example, when the data transmission originated point set in S90 is "0," the predetermined bytes of the scanned data starting from the initial byte are read. For another example, when the data transmission originated point set in S90 is "1000," the predetermined bytes of the scanned data starting from the 1000th byte are read. The scanned data being read is stored in a predetermined buffer area in the storage area 30.

In S96, the control unit 20 writes the scanned data stored in the predetermined buffer area in S94 in the in-transmission file. More specifically, the control unit 20 transmits a command to instruct the PC 40 to write the scanned data in the predetermined buffer area in the in-transmission file to the PC 40. Thus, the scanned data is written in the in-transmission file.

In S98, the control unit 20 updates the data transmission originated point of the scanned data. Specifically, the control unit 20 increments the data transmission originated point by the number of bytes of the scanned data transmitted to the PC 40 in S96. For example, when the data transmission originated point is set to be "0," and the number of bytes of the scanned data transmitted in S96 is "1000," the control unit 20 updates the data transmission originated point to be "1000." Further, the control unit 20 updates the number of transmitted bytes 110 in the transmission management data 100 corresponding to the current data transmission task. That is, the control unit 20 increments the number of transmitted bytes 110 by the number of bytes of the scanned data transmitted in S96. For example, when the number of transmitted bytes 110 is "1000," and the number of bytes of the scanned data transmitted in S96 is "1000," the control unit 20 updates the number of transmitted bytes 110 to "2000."

In S100, the control unit 20 examines as to whether the number of transmitted bytes 110 in the transmission management data 100 corresponding to the current data transmission task matches the total number of bytes 108 to be transmitted. If the number of transmitted bytes 110 does not match the total number of bytes 108 (S100: NO), the control unit 20 returns to S94 and repeats S94-S100 until it is determined that the number of transmitted bytes 110 in the transmission management data 100 matches the total number of bytes 108 to be transmitted in S100 (S100: YES). The control unit 20 proceeds to S102.

In S102, the control unit 20 transmits a CLOSE command, which instructs the PC 40 to close the in-transmission file, to the PC 40. Thereafter, in S104, the control unit 20 notifies the scanning process (FIGS. 5-7) running in parallel of completion of the data transmission. Thus, the data transmission task is completed.

Next, steps following S22 in FIG. 5 in the scanning process will be described. In S22, the control unit 20 examines as to whether all of the data transmission tasks, which were activated in S20 or in S74 in FIG. 7 (described later), have notified the control unit 20 of completion of data transmission (see S104 in FIG. 8). If not all the transmission tasks notified of completion of the data transmission (S22: NO), the control unit 20 proceeds to S40 in FIG. 6.

In S40, the control unit 20 examines as to whether a predetermined time period has elapsed based on the value indicated by the elapse time counter activated in S18 in FIG. 5. The predetermined time period may be set based on a size of the remaining data, and/or a bandwidth of the interfaces through which the scanned data is transmitted. Alternatively, the predetermined time period may be a fixed period. When the predetermined time period has elapsed (S40: YES), the control unit 20 proceeds to S42. When the predetermined time period has not elapsed (S40: NO), the control unit 20 returns to S22.

In S42, the control unit 20 examines as to whether the CPU of the control unit 20 has idled (i.e., ready) over a predetermined idling period based on the idle time counter activated in S18 in FIG. 5. The predetermined idling period may be obtained by a value indicated by the idle time counter multiplied by a predetermined ratio (e.g., 50%). When the CPU has not idled over the predetermined idling period (S42: NO), the control unit 20 returns to S22.

When the CPU has idled over the predetermined idling period (S42: YES), in S44, the control unit 20 refers to the transmission management data 100 firstly created in S14-S18. Further, the control unit 20 initializes and restarts the elapse time counter and the idle time counter. The control unit 20 proceeds to S46.

In S46, the control unit 20 obtains a number of remaining bytes of the scanned data to be transmitted. The remaining bytes of the scanned data can be obtained by the total number of bytes 108 subtracted by the number of transmitted bytes 110 in the transmission management data 100. In S46, further, the control unit 20 examines as to whether the number of remaining bytes to be transmitted is greater than a predetermined number of bytes. The predetermined number of bytes may be a fixed value or a variable value. When the predetermined number of bytes is a variable number, the predetermined number may be obtained based on, for example, the total number of bytes in the scanned data (e.g., 10% of the total number of bytes). When the number of remaining bytes to be transmitted is not greater than the predetermined number (S46: NO), the control unit proceeds to S76 in FIG. 7.

When the number of remaining bytes is greater than the predetermined number (S46: YES), in S48, the control unit 20 examines as to whether a plurality of communication sessions can be established in parallel between the scanner device 10 and the PC 40 based on the IP address provided to the scanner device 10. The determination is made based on the examined result obtained in S12 in FIG. 5, which is stored in the storage area 30. When a plurality of communication sessions cannot be established in parallel (S48: NO), the control unit 20 proceeds to S50. When a plurality of communication sessions can be established (S48: YES), the control unit 20 proceeds to S54.

Following S48 (S48: NO), in S50, the control unit 20 examines as to whether there is a usable IP address to establish a communication session provided to the scanner device 10 and being different from the IP address which has been used and examined in S48. If there is no usable IP address (S50: NO), the control unit 20 proceeds to S76 in FIG. 7. When the scanner device 10 is provided with a different usable IP address (S50: YES), in S52, the control unit 20 creates a new set of transmission management data 100. The control unit 20 writes the different usable IP address in the transmission management data 100 to be the IP address 102. The control unit 20 proceeds to S70 in FIG. 7.

Following S48 (S48: YES), in S54, the control unit 20 creates a new set of transmission management data 100. Specifically, a predetermined sized area is reserved in the transmission management data storage area 28 to store the transmission management data 100. In S54, the control unit 20 writes the IP address in the transmission management data 100 referred to in S44 or an IP address in transmission management data 100 referred to in S78 in FIG. 7 (described later) in the transmission management data 100 to be the IP address 102. The control unit 20 proceeds to S70 in FIG. 7.

Figure 9:
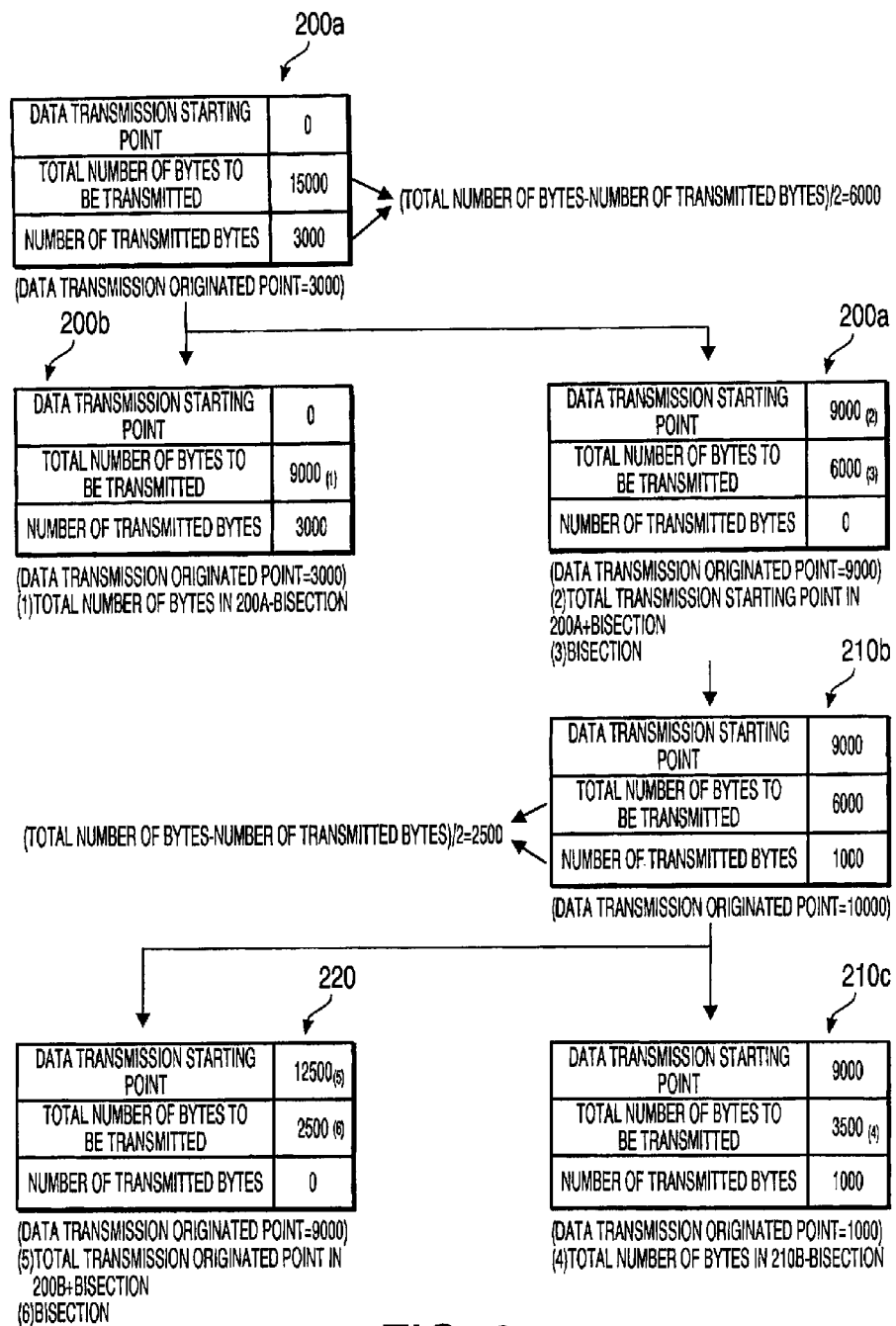
FIG. 9 illustrates contents of the transmission management data being created and updated in the scanning process in the scanner device according to the embodiment of the present invention.

In S70, the control unit 20 updates the total number of bytes 108 to be transmitted in the transmission management data 100 referred to in S44 or in S78. Further, the control unit 20 writes a data transmission starting point 106 and a total number of bytes 108 to be transmitted and a number of transmitted bytes 110 in the transmission management data 100 created in S52 or S54. A method to obtain the values to be written in the transmission management data 100 in S70 will be described hereinbelow with reference to FIG. 9. FIG. 9 illustrates contents of the transmission management data being created and updated in the scanning process in the scanner device 10 according to the embodiment of the present invention The control unit 20 obtains the number of remaining bytes to be transmitted by subtracting the number of transmitted bytes 110 (i.e., 3000) from the total number of bytes 108 (i.e., 15000) in the transmission management data 100 (200*a*) which was referred to in S44 (or S78). Thereafter, the obtained number of remaining bytes is divided by two (i.e., (15000−3000)/2=6000). Further, the bisected number (i.e., 6000) is subtracted from the total number of bytes 108 (i.e., 15000) to be transmitted in the transmission management data 200*a* (i.e., 15000−6000=9000). The total number of bytes 108 to be transmitted in the transmission management data 200*a* is updated to be 9000. Thus, the transmission management data 200*a* is updated to be transmission management data 200*b*. Next, the bisected number (i.e., 6000) is added to the number indicating the data transmission originated point (i.e., 3000) for the scanned data corresponding to the transmission management data 200*a*, which was referred to in S44 or S78, and the added number (i.e., 6000+3000=9000) is written in the transmission management data 210*a*, which was created in S52 or S54, to be the data transmission starting point 106 of the transmission management data 210*a*. The number of remaining bytes 110 according to the transmission management data 200*a* (i.e., 12000) divided by two (i.e., 12000/2=6000) is written in the transmission management data 210*a* to be the total number of bytes 108 to be transmitted. Further, a value "0" is written in the transmission management data 210*a*, which was created in S52 or S54, to be the number of transmitted bytes 110.

Further, when the transmission management data 210*b* is referred to in S78, as shown in FIG. 9, the transmission management data 210*b* includes the number of total bytes 108 being 6000 and the number of transmitted bytes 110 being 1000. The number of remaining bytes being 5000 is obtained by 1000 subtracting from 6000. The number of remaining bytes 5000 is bisected (i.e., 5000/2=2500), and the bisected number 2500 is subtracted from the total number of bytes 108 (i.e., 6000−2500=3500). Accordingly, a total number of bytes 108 (i.e., 3500) is written in the transmission management data 210*b*, which is thus updated to be transmission management data 210*c*.

When the transmission management data 210*b* is referred to in S78, in S52 or S54, transmission management data 220 is newly created. The data transmission starting point 106 is obtained by adding a bisected number of remaining bytes (i.e., (6000−1000)/2=2500) to the data transmission starting byte (i.e., 10000) for the transmission management data 210*b* (i.e., 10000+2500=12500). Accordingly, a value 125000 is written in the transmission management data 220 to be the data transmission starting point 106. Further, the bisected number of remaining bytes (i.e., 2500) is written in the transmission management data 220 to be the total number of bytes 108. Furthermore, a value "0" is written in the transmission management data 220, to be the number of transmitted bytes 110.

Following S70 in FIG. 7, in S72, the control unit 20 establishes connection with the PC 40. In this step, the usable IP address 102 written in the transmission management data 100 in S52 or in S54 is used. The communication session between scanner device 10 and the PC 40 based on the usable IP address 102 is established in a process similar to that is performed in S18 (see FIG. 5). The control unit 20 writes the connection ID obtained in the connection establishment is written in the transmission management data 100, which was created in S52 or S54, to be the connection ID 104. Thus, the transmission management data 100 is completed with the items 102-110.

In S74, the control unit 20 activates a data transmission task (see FIG. 8) to run according to the transmission management data 100, which was created in S52 or S54. Therefore, the data transmission task activated in S20 (see FIG. 5) and the data transmission task activated in S74 are run concurrently to be performed by the control unit 20. Additionally or alternatively, a data transmission task activated in previous S74 can be run concurrently with the data transmission tasks activated in S20 and current S74. Thus, the scanned data stored in the scanned-data file created in S10 (see FIG. 5) is transmitted to the PC 40 in a plurality of data transmission tasks through a plurality of communication sessions concurrently. The control unit proceeds to S76.

It is to be noted that a plurality of sets of transmission management data 100 are present in the transmission management data storage area 28 when transmission management data 100 is referred to in S44, and all of the plurality of sets of transmission management data 100 are to be processed through the steps following S46. Therefore, in S76, the control unit 20 examines as to whether all of the transmission management data 100 has been processed through steps following S46. If there is a set of unprocessed transmission management data 100 remains (S76: NO), in S78, the control unit 20 refers to a next set of transmission management data 100 in the transmission management data storage area 28 so that the next set of transmission management data 100 is processed through steps following S46. When all of the transmission management data 100 in the transmission management data storage area 28 has been processed (S76: YES), the control unit 20 returns to S22 (see FIG. 5).

In S22, the control unit 20 examines as to whether all of the data transmission tasks, which were activated in S20 or in S74 in FIG. 7, have notified the control unit 20 of completion of data transmission. If all the transmission tasks notified of completion of the data transmission (S22: YES), in S24, the control unit 20 disconnects all of the communication session between the scanner device 10 and the PC 40. Further, the control unit 20 deletes all of the sets of the transmission management data 100. Thus, the scanning process is terminated.

According to the scanner device 10 in the above embodiment, a single scanned-data file divided in sets can be transmitted concurrently in a plurality of communication sessions.

It is to be noted, if a scanned-data file is transmitted in a single communication session, transmission of a divided portion of scanned-data and reception of a response are repeated serially until transmission of the entire scanned-data file is completed. In other words, a next data transmission cannot be started until a response to a previous data transmission is received. In the above embodiment, on the other hand, the scanned-data file can be transmitted in parallel within the plurality of data transmission tasks, and the data transmission does not require reception of responses to the previous data transmission from the PC 40. Therefore, the scanned-data file can be transmitted in a shorter runtime.

According to the scanner device 10 in the above embodiment, further, the data sizes of the divided scanned data to be transmitted concurrently are substantially balanced (i.e., bisections in S70) so that the scanned data file can be transmitted in a shorter runtime.

It is to be noted that the scanner device 10 according to the above embodiment examines as to whether the PC 40 is capable of establishing a plurality of communication sessions with the scanner device 10 based on one IP address provided to the scanner device 10 (see S12 in FIG. 5). When affirmative judgment is made, the scanner device 10 establishes a plurality of communication sessions based on the single IP address. Meanwhile, when negative judgment is made, the scanner device 10 establishes a plurality of communication sessions based on a plurality of IP addresses. It is to be noted that establishing a plurality of communication sessions based on a single IP address is prioritized over establishing a plurality of communication sessions based on a plurality of IP addresses. Therefore, a plurality of communication sessions can be established based on less IP addresses preferentially.

Further, it is to be noted that a plurality of data transmission tasks are activated concurrently specifically when the CPU is maintained idling for a predetermined idling time period (see S42 in FIG. 6). Thus, activation of a plurality of data transmission tasks concurrently can be avoided when the CPU is maintained idling for a shorter period of time. It is to be noted that activation of a plurality of data transmission tasks when the CPU is maintained idling for a shorter period of time may cause the runtime of the entire data transmission to be longer.

The scanner device 10 according to the above embodiment activates a new data transmission task specifically when the number of remaining bytes to be transmitted in the data transmission task is greater than a predetermined number (see S46 in FIG. 6). It is to be noted that the data transmission may be completed in a shorter time period when the number of the remaining bytes to be transmitted is smaller. This is because that activation of a new data transmission task requires steps S52, S54, S70, and S72, for example, which may require additional runtime.

Although an example of carrying out the invention has been described, those skilled in the art will appreciate that there are numerous variations and permutations of the data transmission device that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the PC 40 being an external device to be connected with the scanner device 2 to establish communication sessions may be replaced with other data communication devices such as a server, a printer, a mobile terminal including a cell phone and a PDA (Personal Digital Assistance).

For another example, the scanner device 10 may be equipped with a plurality of different types of interfaces. Alternatively, the scanner device 10 may be equipped with a single interface. For another example, the scanner device 10 may store the examined result obtained in S12 (see FIG. 5) after completion of the scanning process. In this regard, the control unit 20 may not necessarily examine as to whether a plurality of communication sessions can be established with the PC 40 in parallel, but the stored examination result can be utilized.

For another example, a communication protocol to be used between the scanner device 10 and the PC 40 is not limited to CIFS protocol but may be, for example, FTP (File Transfer Protocol) and WebDAV (Distributed Authoring and Versioning protocol for the World Wide Web).

Further, in S70 (see FIG. 7), the number of remaining bytes to be transmitted is divided by two to obtain the total number of bytes to be transmitted. However, the number of remaining bytes may not necessarily be divided by two, but may be divided by a different number.

What is claimed is:

1. A data transmission device to transmit a data file to an external device, comprising:
    a data file memory, in which a data file to be transmitted is stored; and
    a data transmission controller to control operations in the data transmission device,
    wherein the data transmission controller establishes a plurality of communication sessions between the data transmission device and a single external device;
    wherein the data transmission controller transmits data included in the data file and divided in portions concurrently through the plurality of communication sessions to the single external device through the plurality of communication sessions established between the data transmission device and the single external device;
    wherein the data transmission controller establishes a plurality of communication sessions with the single external device based on one of a single IP address and a plurality of IP addresses provided to the data transmission device;
    wherein the data transmission controller determines whether the single external device is capable of establishing a plurality of communication sessions with the data transmission device based on the single IP address provided to the data transmission device; and
    wherein the data transmission controller establishes a plurality of communication sessions with the single external device based on the plurality of IP addresses provided to the data transmission device when the data transmission controller determines that the single external device is incapable of establishing the plurality of communication sessions based on the single IP address.

2. The data transmission device according to claim 1, wherein the data transmission controller activates a plurality of data transmission tasks, each of which is to transmit one of the divided data portions through one of the plurality of communication sessions, concurrently.

3. The data transmission device according to claim 2, wherein the data transmission controller divides the data included in the data file in portions so that data sizes of the data portions are in a predetermined balance.

4. The data transmission device according to claim 3, wherein the data transmission controller activates a first data transmission task and a second data transmission task successively to run the first and the second data transmission tasks concurrently;

wherein the data transmission controller determines a data transmission starting point of a data portion to be transmitted in the second data transmission task by:

obtaining a transmitted data size, which indicates a size of a data portion transmitted in the first data transmission task, and a remaining data size, which indicates a size of a remaining data piece in the data file obtained based on the transmitted data size and a data size of the entire data file;

dividing the remaining data size by a predetermined number to obtain a divided data size indicating a data size of each data portion in the remaining data piece; and combining the divided data size and the transmitted data size.

5. The data transmission device according to claim 1, wherein the data transmission controller determines whether the single external device is capable of establishing a plurality of communication sessions with the data transmission device based on the single IP address provided to the data transmission device, wherein the data transmission controller establishes the plurality of communication sessions with the single external device based on the single IP address when the data transmission controller determines that the single external device is capable of establishing the plurality of communication sessions bases on the single IP address.

6. The data transmission device according to claim 1, wherein the data transmission controller determines as to whether the data transmission device has been idling over a predetermined idling period, wherein the data transmission controller transmits the data included in the data file in portions concurrently through the plurality of communication sessions to the single external device when the data transmission controller determines that the data transmission device has been idling over the predetermined idling period.

7. The data transmission device according to claim 1, wherein the data transmission controller creates a data file including data identical to the data being transmitted to the single external device in a common data folder in the single external device, which can be accessed by the data transmission device through the plurality of communication sessions.

8. The data transmission device according to claim 2, further comprising:

a starting point memory, in which a data transmission starting point of the divided data portion to be transmitted in each data transmission task is stored, wherein the data transmission controller transmits the divided data portion starting from the data transmission starting point in each data transmission task according to the data transmission starting point stored in the starting point memory.

9. The data transmission device according to claim 8, further comprising:

a transmitting data size memory, in which a data size of the data portion to be transmitted in each data transmission task is stored, wherein the data transmission controller transmits the divided data portion, which is divided according to the transmitting data size stored in the transmitting data size memory, in each data transmission task.

10. The data transmission device according to claim 9, further comprising:

a transmitted data size memory, in which a data size of the data portion having been transmitted in each data transmission task is stored, wherein the data transmission controller transmits the divided data portion, which is a remaining data piece in the data file excluding the data portion defined by the transmitted data size.

11. The data transmission device according to claim 1, wherein the data transmission controller creates scanned data which represents a scanned image;

wherein the data file memory stores a scanned-data file including the scanned data created by the data transmission controller; and wherein the data transmission controller transmits the scanned data included in the scanned data file to the single external device through the plurality of communication sessions concurrently.

12. A non-transitory computer readable storage medium comprising computer readable instructions to control a computer to transmit a data file to an external device by executing steps of:

storing a data file to be transmitted in a data file memory;

establishing a plurality of communication sessions between the data transmission device and a single external device;

transmitting data included in the data file and divided in portions concurrently to the single external device through the plurality of communication sessions established between the computer and the single external device;

establishing a plurality of communication sessions with the single external device based on one of a single IP address and a plurality of IP addresses provided to the data transmission device;

determining whether the single external device is capable of establishing a plurality of communication sessions with the data transmission device based on the single IP address provided to the data transmission device; and establishing a plurality of communication sessions with the single external device based on the plurality of IP addresses provided to the data transmission device when the data transmission controller determines that the single external device is incapable of establishing the plurality of communication sessions based on the single IP address.

13. A method to control a computer to transmit a data file to an external device, comprising:

storing a data file to be transmitted in a data file memory;

establishing a first communication session to transmit the data file between the computer and a single external device;

examining as to whether a second communication session is available between the computer and the single external device while the data file is being transmitted;

dividing remaining data in the data file, which has not yet been transmitted in the first communication session, into pieces so that each data piece is transmitted through the first and the second communication sessions respectively between the computer and the single external device when it is determined that the second communication session is available;

concurrently transmitting each data piece to the single external device through the first and the second communication sessions established between the computer and the single external device;

establishing a plurality of communication sessions with the single external device based on one of a single IP address and a plurality of IP addresses provided to the data transmission device;

determining whether the single external device is capable of establishing a plurality of communication sessions with the data transmission device based on the single IP address provided to the data transmission device; and establishing a plurality of communication sessions with the single external device based on the plurality of IP addresses provided to the data transmission device when the data transmission controller determines that the single external device is incapable of establishing the plurality of communication sessions based on the single IP address.

* * * * *